United States Patent [19]

Gomez

[11] 4,314,149

[45] Feb. 2, 1982

[54] DAILY MILEAGE RECORDING UNIT

[75] Inventor: Michel Gomez, Joinville-le-Pont, France

[73] Assignee: e.d. Veglia, Paris, France

[21] Appl. No.: 104,432

[22] Filed: Dec. 17, 1979

[30] Foreign Application Priority Data

Dec. 20, 1978 [FR] France ............................ 78 35750

[51] Int. Cl.$^3$ ............................ G01C 22/00

[52] U.S. Cl. ............................ 235/96; 235/139 R; 235/144 HC; 235/144 SM

[58] Field of Search ............ 235/1 R, 1 C, 1 D, 109, 235/130 R, 144 R, 144 DM, 144 M, 144 HC, 144 SM, 144 SP, 144 TP, 95 R, 139 R, 134, 133 R, 96, 97

[56] References Cited

U.S. PATENT DOCUMENTS

| | | | |
|---|---|---|---|
| 2,539,368 | 1/1951 | Hoye | 235/1 R |
| 3,643,072 | 2/1972 | Szeluga | 235/144 HC |
| 3,835,303 | 9/1974 | Krauss | 235/144 HC |
| 4,204,112 | 5/1980 | Lane | 235/95 R |

*Primary Examiner*—George H. Miller, Jr.

*Assistant Examiner*—Benjamin R. Fuller

*Attorney, Agent, or Firm*—Jacobs & Jacobs

[57] ABSTRACT

A daily mileage recording unit, of the type comprising a plurality of drums mounted side by side on the same shaft and supported in rotation by a frame, a swinging member mounted to pivot with respect to the frame, a series of gears carried by the swinging member, each disposed between two drums to displace one drum by one graduation when the preceding drum has effected a complete revolution, a sliding member guided in translation in the frame and provided with a push button, a mechanism connecting the sliding member to the swinging member to pivot the latter when the push button is displaced, a cam rigidly locked with each drum and an actuator associated with each cam and carried by the swinging member for returning to zero the corresponding drum when the push button is actuated, a square rigidly locked with each gear and ramps carried by the frame which are engaged by respective squares during the pivoting of the gears, the contact surface of the ramp being a circular sector centered on the pivoting axis.

3 Claims, 4 Drawing Figures

DAILY MILEAGE RECORDING UNIT

The present invention relates to a daily mileage recording unit which is returned to zero by a push button, adapted to be incorporated in the speedometer-odometer of a vehicle.

A daily mileage recording unit as disclosed e.g. in French Pat. No. 1 358 949 comprises a plurality of drums mounted side by side on the same shaft and supported in rotation by a frame, a swinging member mounted to pivot about an axis with respect to the frame, a plurality of gears secured to the swinging member, each disposed between two drums to rotate a drum by one graduation when the preceding drum has effected a complete revolution, a sliding member guided in translation in the frame and provided with a push button, a mechanism for connecting the sliding member to the swinging member to cause the latter to pivot when the push button is depressed, a cam operatively connected with each drum and an actuator associated with each cam and secured to the swinging member for returning to zero the respective drum when the push button is actuated.

The action on the push button not only results in rotating the cams, but also pivoting the gears out of engagement with the drums so as to allow return to zero of the same. It is essential that, in the course of this pivoting motion, the angular position of the gears is not altered in order that, on the return, the engagement with the drums occurs in suitable manner.

It is known, in order to hold the gears in a correct position, to provide a leaf spring in engagement with squares secured to the gears. However, this solution has a drawback in that an opposing torque is generated, as the leaf spring is constantly in abutment.

It is an object of the present invention to maintain the angular position of the gears during the return to zero by a very simple means, which is operative only during the return to zero.

According to the invention, there is provided a square secured to each gear and ramps secured to the frame which are engaged by respective squares during the pivoting of the gears, the contact surface of the ramps being circular sectors centred on the pivoting axis.

The gears are thus prevented from rotating about their shaft during pivoting. The ramps act only during the return to zero, whereby the above-mentioned drawback is overcome. Furthermore, the ramps are very simple to produce as they are molded integrally with the frame.

The invention will be more readily understood on reading the following description with reference to the accompanying drawings, in which.

Figure 1:
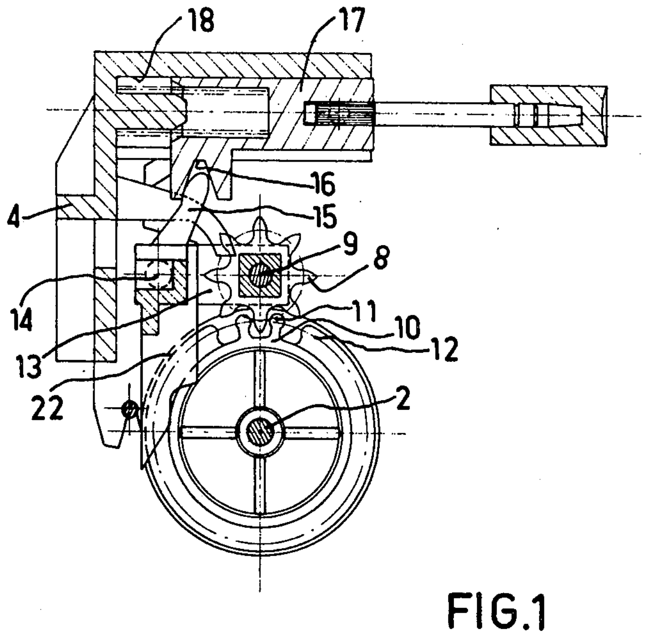
FIG. 1 is a transverse sectional view of a daily mileage recording unit incorporated in a speedometer according to the invention, in counting position.

Referring now to the drawings, the daily mileage recording unit for vehicle comprises a series of drums 1, graduated from 0 to 9, idly mounted side by side on a common shaft 2.

The ends 3 of the shaft 2 carrying the drums are mounted in recesses formed in a frame 4.

In conventional manner in this type of device, a screw gear 5 connected to a drive take-off drives a gear 6, called dummy drum, coaxial with respect to drums 1, which dummy drum is connected to the first drum 1*a* during counting by an outer gear 7 in mesh both with the dummy drum 6 and with the first drum 1*a*. Outer gears 8 with eight teeth are further mounted on the same shaft 9 as the abovementioned gear 7, each being mounted between two consecutive drums to rotate one drum by one graduation when the preceding drum has rotated through a complete revolution. To this end, there are fixed to each durm a toothed rim 10 comprising two teeth 11, whereby the gear 8 rotates through a quarter of a revolution when the drum which drives it rotates by one graduation, and a rim 12 having twenty teeth similar to teeth 11 distributed over its periphery. Of course, the drums located at the ends need only comprise one of these rims, the drum adjacent the dummy drum comprising a rim with two teeth and the drum located at the opposite end carrying only one rim with twenty teeth.

The shaft 9 of the gears 8 is carried by a swinging member 13 mounted to pivot with respect to the frame 4 via a pivot pin 14. A finger 15 secured by the swinging member is engaged in the groove 16 of a sliding member 17 guided in translation in a housing 18 of the frame. A push button 19 is fixed to the sliding member 17 to actuate same and a spring 20 is mounted at the rear end of the housing 18 about a lug 21 for returning the slide member into "out" position.

A finger 22 carried by the swinging member 13 is associated with each drum 1, the assembly of the fingers forming a comb-like structure.

These fingers have one end inclined so as to be able to act on respective heart-shaped cams 23, each cam being rotatably locked with a drum.

FIG. 1 shows the device in counting position. The gears 8 are in mesh with the respective drums 1, the first drum 1*a* is driven by the dummy drum 6.

Figure 2:
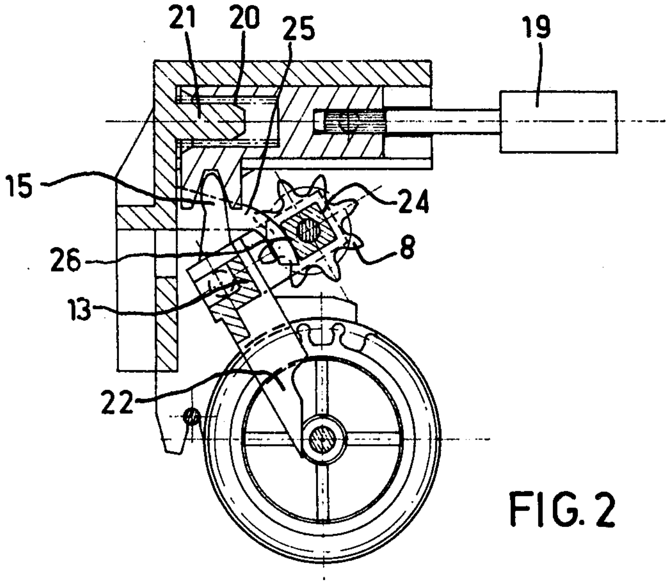
FIG. 2 shows the daily mileage recording unit of FIG. 1 in the course of the return to zero.

FIG. 2 illustrates the position in the course of return to zero. The operator has depressed the push button 19, this causing the swinging member 13 to pivot via the finger 15. This results in the fingers 22 of the comb penetrating between the drums and causing the respective cams 23 to rotate to the desired position by aligning the "zero" places of the drums facing the operator. Simultaneously, the pivoting of the swinging member 13 separates the gears 8 from the rims 10 and 12, this being necessary to allow the drums to rotate.

It is important that the gears 8 do not rotate about their shaft during this pivoting motion. To this end, the shaft 9 carries squares 24, each of which is rigidly locked with a gear 8, and a ramp 25 carried by the frame 4 is associated with each square 24.

The ramps 25 have an outer contact surface 26 in the form of a circular sector centred on the pivoting axis of the swinging member 13, so that, during the pivoting of the swinging member 13, this contact surface 26 guides the squares 24, preventing the gears 8 from rotating about their shaft.

The gears 8, once the return to zero is effected, therefore exactly resume their correct positions with respect to the toothed rims 10 and 12.

It will be noted that the tips of the ramps 25 are, in the position of FIG. 1, placed very slightly outside the circle described by the corners of the squares 24, so as not to hinder the rotation of the gears 8, and at the same time to afford a guide for the squares 24 upon return to zero, from the beginning of the pivoting movement of the gears 8.

The frame 4 is preferably made of plastics material and the ramps 25 are formed during molding and are integral with the frame 4.

Figure 3:
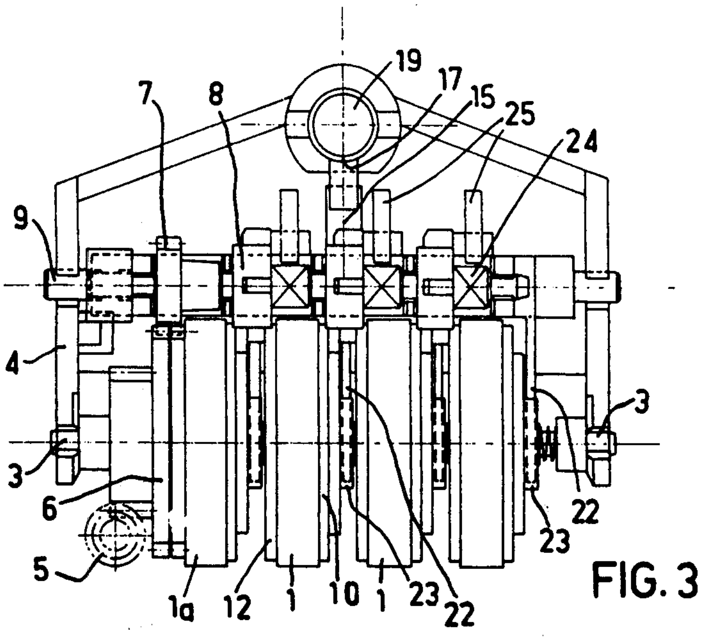
FIG. 3 is a front view of the daily mileage recording unit of FIG. 1.
Figure 4:
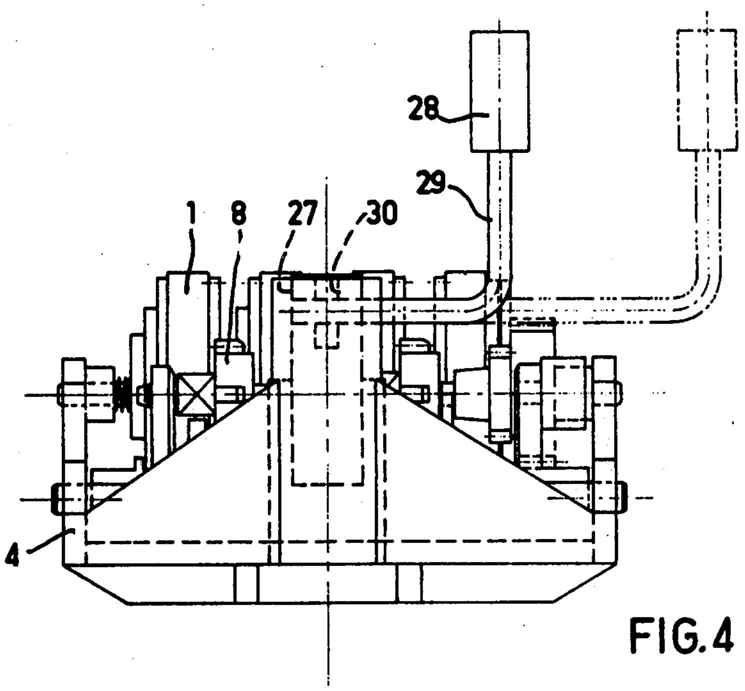
FIG. 4 is a plan view illustrating a modified embodiment.

It will be noted in FIG. 3 that diametrically opposite notches 27 are made in the part of the frame 4 which defines the housing 18 of the sliding member. As shown in FIG. 4, this makes it possible to actuate the sliding member 17 by a push button 28 mounted at the end of a bent rod 29 whose end penetrates in the notches 27. The bent rod 29 may be given any desired length depending on needs, FIG. 4 illustrating two different lengths. However, the sliding member 17 always comprises an axial hole 30 enabling the push button to be mounted as shown in FIGS. 1 and 2.

What I claim is:

1. A daily mileage recording unit, of the type comprising a plurality of drums mounted side-by-side on the same shaft and supported in rotation by a frame, a swinging member mounted to pivot with respect to the frame, a series of gears carried by the swinging member, each disposed between two drums to displace one drum by one graduation when the preceding drum has effected a complete revolution, a sliding member guided in translation in the frame and provided with a push button, a mechanism connecting the sliding member to the swinging member to pivot the latter when the push button is displaced, a cam rotatably locked with each drum and an actuator associated with each cam and carried by the swinging member for returning to zero the corresponding drum when the push button is actuated, a square rigidly locked with each gear and ramps carried by the frame which are engaged by respective squares during the pivoting of the gears, the contact surface of the ramp being a circular sector centred on the pivoting axis.

2. A mileage recording unit as claimed in claim 1, wherein the ramps are molded integrally with the frame.

3. A mileage recording unit as claimed in claim 1, wherein the push button is connected to the sliding member by a bent rod which penetrates in notches made in the frame.

* * * * *